(12) United States Patent
Hashemzadeh

(10) Patent No.: US 8,637,613 B2
(45) Date of Patent: Jan. 28, 2014

(54) SELF-DISPERSIBLE SILICONE COPOLYMERS AND METHOD FOR THE PRODUCTION AND USE THEREOF

(75) Inventor: Abdulmajid Hashemzadeh, Burgkirchen (DE)

(73) Assignee: Wacker Chemie AG, München (DE)

( * ) Notice: Subject to any disclaimer, the term of this patent is extended or adjusted under 35 U.S.C. 154(b) by 1066 days.

(21) Appl. No.: 12/375,154

(22) PCT Filed: Aug. 7, 2007

(86) PCT No.: PCT/EP2007/058187
§ 371 (c)(1),
(2), (4) Date: Sep. 15, 2009

(87) PCT Pub. No.: WO2008/017671
PCT Pub. Date: Feb. 14, 2008

(65) Prior Publication Data
US 2010/0010165 A1    Jan. 14, 2010

(30) Foreign Application Priority Data
Aug. 9, 2006 (DE) .................. 10 2006 037 270

(51) Int. Cl.
*C08F 30/08* (2006.01)
*C08F 283/12* (2006.01)

(52) U.S. Cl.
USPC ........... 525/479; 524/755; 524/765; 524/766; 524/770; 524/773; 524/866; 526/279; 525/50; 525/474

(58) Field of Classification Search
USPC ........... 525/50, 474, 479; 524/755, 766, 765, 524/770, 773, 866; 526/279
See application file for complete search history.

(56) References Cited

U.S. PATENT DOCUMENTS

| | | | |
|---|---|---|---|
| 5,510,442 A | 4/1996 | Bambury et al. | |
| 5,618,879 A | 4/1997 | Cavivenc et al. | |
| 6,255,362 B1 | 7/2001 | Ito | |
| 2003/0114583 A1* | 6/2003 | Stark et al. | 524/588 |
| 2005/0143547 A1* | 6/2005 | Stark et al. | 528/25 |

FOREIGN PATENT DOCUMENTS

| | | |
|---|---|---|
| CN | 1178819 | 4/1998 |
| CN | 1217361 | 5/1999 |
| DE | 4330279 | 3/1994 |
| DE | 4426832 | 2/1996 |
| EP | 0352339 | 1/1990 |
| EP | 0614924 | 9/1994 |
| EP | 0690109 | 1/1996 |
| EP | 0771826 | 5/1997 |
| EP | 0810243 | 12/1997 |
| EP | 0937998 | 8/1999 |
| EP | 1308468 | 5/2003 |
| JP | 2005 140255 | 6/1993 |
| JP | 08-012901 | 1/1996 |
| JP | 2000-169510 | 6/2000 |
| JP | 2002-201234 | 7/2002 |
| JP | 2004-075755 | 3/2004 |
| WO | WO/2005/113142 | 1/2005 |

OTHER PUBLICATIONS

International Search Report, dated Oct. 2, 2007.

* cited by examiner

*Primary Examiner* — Irina S Zemel
*Assistant Examiner* — Jeffrey Lenihan
(74) *Attorney, Agent, or Firm* — RatnerPrestia

(57) ABSTRACT

The invention relates to highly transparent organofunctional silicone copolymers, being self-dispersible in water without emulsifiers or protective colloid, being obtained by radically initiated solution polymerization of a) one or more ethylenically unsaturated organomonomers, and b) one or more siliconmacromeres, characterized in that c) one or more water soluble comonomeres are copolymerized in an organic solvent or solvent mixture.

22 Claims, No Drawings

SELF-DISPERSIBLE SILICONE COPOLYMERS AND METHOD FOR THE PRODUCTION AND USE THEREOF

FIELD OF INVENTION

The invention relates to highly transparent organosilicone copolymers which are self-dispersible in water and also to their preparation from organic monomers, silicone macromers, and water-soluble comonomers by means of free-radically initiated solution polymerization.

BACKGROUND OF INVENTION

Compositions of dispersible organosilicone copolymers are obtainable by emulsion polymerization in an aqueous medium, the stabilization of the resulting dispersions further requiring emulsifiers or protective colloids, as described, for example, in EP-A 1308468 or EP-A 771826.

EP-A 614924 as well describes the preparation of organosilicone copolymers by means of emulsion polymerization in water with the addition of surface-active substances. The process described therein is applicable only to free-radically polymerizable silicone monomers of low molecular weight, since, if high molecular weight silicone monomers are employed, there is a reduction in the rate of polymerization and, furthermore, there is aggregation of the polymers during the polymerization, or a decrease in the stability of the copolymer emulsion.

EP-A 352339 describes a process for preparing organosilicone copolymers by means of solution polymerization, with the silicone fraction being included in the initial charge in the solvent, and with continuous metering of a mixture of monomers and oil-soluble initiator. The copolymers obtainable in this way, however, are not dispersible in water. Dispersing these copolymers requires dispersing assistants such as emulsifiers or protective colloids.

In EP-A 810243 and JP-A 05-009248, silicone macromers are polymerized with organic monomers in aqueous emulsion, operating exclusively with oil-soluble initiator. A disadvantage with processes involving initiation with oil-soluble initiators is the inadequate stability of the resultant dispersions, which have a very strong propensity toward phase separation.

From U.S. Pat. No. 5,618,879 an emulsion copolymerization of a mixture of silicone macromer and ethylenically unsaturated monomer in the presence of anionic emulsifiers and water-soluble initiator in water is described. In JP-A 05-140255 the silicone macromer is dissolved in the organic monomer, emulsification takes place in water, using anionic emulsifier, and the polymerization is initiated using water-soluble initiator. Disadvantageous features in this case too are that surface-active substances must be used and that a considerable fraction—more than 20%—of the silicone macromer is not copolymerized.

A common feature of the known compositions of dispersible organosilicone copolymers is that their preparation by copolymerization of silicone macromers with organic monomers requires the presence of emulsifiers or protective colloids. The organosilicone copolymer compositions obtainable in this way, however, have a propensity toward phase separation. Phase separation during the polymerization leads to cloudy polymer films. Migration of the emulsifiers or protective colloids in organosilicone copolymer compositions is known to have an adverse effect on the water resistance, adhesion or stability properties of the organosilicone copolymer compositions.

A further problem lies in the provision of highly transparent dispersible organosilicone copolymer compositions with a high silicone fraction. Particularly when organosilicone copolymers with a silicone fraction of more than 20% by weight are prepared, poor compatibility between olefinic monomers and silicones leads, during the free-radical polymerization, to problems due to phase separation or gelling, which results in the organosilicone copolymers becoming cloudy.

DETAILED DESCRIPTION OF INVENTION

Against this background the object was to provide self-dispersible, highly transparent silicone copolymers which even at silicone levels of ≥20% by weight can be dispersed in water without emulsifiers or protective colloids.

The invention provides highly transparent organosilicone copolymers, which with exclusion of emulsifiers or protective colloids are self-dispersible in water, obtainable by means of free-radically initiated solution polymerization of a) one or more ethylenically unsaturated organic monomers and b) one or more silicone macromers, characterized in that c) one or more water-soluble comonomers are copolymerized in an organic solvent or solvent mixture.

The organosilicone copolymers obtainable in this way can be dispersed in water without emulsifiers or protective colloids.

Preferred solvents or preferred solvent components in solvent mixtures are aliphatic alcohols having 1 to 6 C atoms such as, for example, methanol, ethanol or propanol, particular preference being given to isopropanol. Particularly preferred are mixtures of solvents composed of isopropanol and one or more solvents selected from the group of alcohols having 1 to 6 C atoms. The solvent mixtures that are the most preferred are isopropanol and ethanol or isopropanol and propanol.

Preference is also given to mixtures of water and one or more alcohols having 1 to 6 C atoms. Particular preference is also given to mixtures of isopropanol and water, preferably having a water fraction of 2-35% by weight and most preferably having a water fraction of 10-25% by weight, based in each case on the total weight of the solvent mixtures.

In the preparation of organosilicone copolymers having silicone contents of ≥20% by weight, based on the total weight of components a) to c), it is preferred to use solvents or solvent mixtures which are nonsolvents for silicone macromer b) and solvents for the monomers a) and c). Silicone macromer b) is soluble therein at less than 5% by weight, and in monomers a) to c) are each soluble therein at more than 5% by weight under standard conditions ($23/50$) in accordance with DIN 50014.

One preferred solvent in the preparation of organosilicone copolymers having silicone contents of ≥20% by weight is isopropanol. Also preferred for this purpose are mixtures of solvents composed of isopropanol and one or more solvents selected from the group encompassing alcohols having 1 to 6 C atoms and water. Particularly preferred solvent mixtures are isopropanol and ethanol or isopropanol and propanol or isopropanol and water.

Ethylenically unsaturated organic monomers a) used with preference in the polymerization are one or more monomers from the group encompassing vinyl esters of unbranched or branched alkylcarboxylic acids having 1 to 15 C atoms, methacrylic esters and acrylic esters of unbranched or branched alcohols having 1 to 15 C atoms, vinylaromatics, olefins, dienes, and vinyl halides.

In general, 5% to 95% by weight ethylenically unsaturated organic monomers a) are used, preferably 20% to 95% by weight, and more preferably 35-75% by weight, based in each case on the total weight of components a) to c).

Preferred vinyl esters are vinyl esters of unbranched or branched carboxylic acids having 1 to 15 C atoms. Particularly preferred vinyl esters are vinyl acetate, vinyl propionate, vinyl butyrate, vinyl 2-ethylhexanoate, vinyl laurate, 1-methylvinyl acetate, vinyl pivalate, and vinyl esters of α-branched monocarboxylic acids having 5 to 13 C atoms, examples being VeoVa5$^R$, VeoVa9$^R$, VeoVa10$^R$ or VeoVa11$^R$ (tradenames of Shell). The most preferred is vinyl acetate.

Preferred organic monomers a) from the group of the esters of acrylic acid or methacrylic acid are esters of unbranched or branched alcohols having 1 to 15 C atoms. Particularly preferred methacrylic esters or acrylic esters are methyl acrylate, methyl methacrylate, ethyl acrylate, ethyl methacrylate, propyl acrylate, propyl methacrylate, n-butyl, isobutyl, and tert-butyl acrylate, n-butyl, isobutyl, and tert-butyl methacrylate, 2-ethylhexyl acrylate, and norbornyl acrylate. The most preferred are methyl acrylate, methyl methacrylate, n-butyl, isobutyl, and tert-butyl acrylate, 2-ethylhexyl acrylate, and norbornyl acrylate.

Preferred dienes are 1,3-butadiene and isoprene. Examples of copolymerizable olefins are ethene and propene. Vinylaromatics which can be copolymerized include styrene and vinyltoluene. From the group of the vinyl halides it is customary to use vinyl chloride, vinylidene chloride or vinyl fluoride, preferably vinyl chloride.

Organic monomers a) copolymerized with preference are vinyl acetate and other vinyl esters selected from the group encompassing vinyl laurate, vinyl pivalate, vinyl 2-ethylhexanoic acid ester, vinyl esters of alpha-branched carboxylic acids such as vinyl esters of Versatic acid (VeoVa9$^R$, VeoVa10$^R$);

vinyl acetate and ethylene, which, optionally, further vinyl esters selected from the group encompassing vinyl laurate, vinyl pivalate, vinyl 2-ethylhexanoic acid ester, fumaric diesters, maleic diesters, vinyl esters of α-branched carboxylic acids such as vinyl esters of Versatic acid (VeoVa9$^R$, VeoaV10$^R$) are copolymerized;

ethylene and vinyl chloride and one or more vinyl esters selected from the group encompassing vinyl acetate, vinyl propionate, vinyl laurate, vinyl pivalate, vinyl 2-ethylhexanoic acid ester, vinyl esters of α-branched carboxylic acids such as vinyl esters of Versatic acid (VeoVa9$^R$, VeoVa10$^R$);

one or more vinyl esters and one or more acrylic esters and optionally ethylene, vinyl esters being selected from the group encompassing vinyl acetate, vinyl laurate, vinyl esters of Versatic acid (VeoVa9$^R$, VeoVa10$^R$), and acrylic esters being selected from the group encompassing butyl acrylate, 2-ethylhexyl acrylate;

two or more acrylic esters and optionally 1,3-butadiene, acrylic esters being selected from the group encompassing methyl methacrylate, butyl acrylate, n-butyl acrylate, 2-ethylhexl acrylate;

styrene and one or more monomers selected from the group encompassing 1,3-butadiene, (meth)acrylic ester, methyl methacrylate, butyl acrylate, 2-ethylhexyl acrylate, n-butyl acrylate, isobutyl acrylate, and tert-butyl acrylate.

Preferred silicone macromers b) are linear, branched, cyclic, and three-dimensionally crosslinked silicones (polysiloxanes) having at least 10 repeating siloxane units and having at least one free-radically polymerizable functional group. The chain length is preferably 10 to 1000 repeating siloxane units. With particular preference the chain length is 25 to 1000 repeating siloxane units. Ethylenically unsaturated groups such as alkenyl groups are preferred as polymerizable functional groups. The silicone fraction in the copolymer is preferably 5% to 70%, more preferably 15% to 60%, most preferably 25% to 60%, by weight, based in each case on the total weight of components a) to c).

Preferred silicone macromers b) are silicones having the general formula $R^1{}_aR_{3-a}SiO(SiR_2O)_nSiR_{3-a}R^1a$, where each R is alike or different and is a monovalent, optionally substituted, alkyl radical or alkoxy radical having in each case 1 to 18 C atoms, $R^1$ is a polymerizable group, a is 0 or 1, and n is 10 to 1000.

In the general formula $R^1{}_aR_{3-a}SiO(SiR_2O)_nSiR_{3-a}R^1a$, examples of radicals R are methyl, ethyl, n-propyl, isopropyl, 1-n-butyl, 2-n-butyl, isobutyl, tert-butyl, n-pentyl, isopentyl, neopentyl, tert-pentyl radical, hexyl radicals such as n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical, cycloalkyl radicals such as cyclopentyl, cyclohexyl, cycloheptyl, and methylcyclohexyl radicals. The radical R is preferably a monovalent hydrocarbon radical having 1 to 6 carbon atoms, such as methyl, ethyl, n-propyl, isopropyl, n-butyl, sec-butyl, amyl, and hexyl radical, the methyl radical being particularly preferred.

Preferred alkoxy radicals R are those having 1 to 6 carbon atoms such as methoxy, ethoxy, propoxy, and n-butoxy radical, which where appropriate may also be substituted by oxyalkylene radicals such as oxyethylene or oxymethylene radicals. Particular preference is given to the methoxy and ethoxy radical. The stated alkyl radicals and alkoxy radicals R may optionally also be substituted, as for example by halogen, mercapto groups, epoxy-functional groups, carboxy groups, keto groups, enamine groups, amino groups, aminoethylamino groups, isocyanato groups, aryloxy groups, alkoxysilyl groups, and hydroxyl groups.

Suitable polymerizable groups $R^1$ are alkenyl radicals having 2 to 8 C atoms. Examples of such polymerizable groups are the vinyl, allyl, butenyl, and also acryloyloxyalkyl and methacryloyloxyalkyl group, the alkyl radicals containing 1 to 4 C atoms. Preference is given to the vinyl group, 3-methacryloyloxypropyl, acryloyloxymethyl, and 3-acryloyloxypropyl group.

Preference is given to α,ω-divinyl-polydimethylsiloxanes, α,ω-di(3-acryloyloxypropyl)-polydimethylsiloxanes, α,ω-di(3-methacryloyloxypropyl)-polydimethylsiloxanes. In the case of the silicones substituted only once by unsaturated groups, preference is given to α-monovinyl-polydimethylsiloxanes, α-mono(3-acryloyloxypropyl)-polydimethylsiloxanes, α-mono(acryloyloxymethyl)polydimethylsiloxanes, α-mono(3-methacryloyloxypropyl)-polydimethylsiloxanes. In the case of the monofunctional polydimethylsiloxanes there is an alkyl or alkoxy radical located at the other end of the chain, a methyl or butyl radical, for example.

Preference is also given to mixtures of linear or branched divinyl-polydimethylsiloxanes with linear or branched monovinyl-polydimethylsiloxanes and/or unfunctionalized polydimethylsiloxanes (the latter possess no polymerizable group). The vinyl groups are located at the end of the chain. Examples of such mixtures are silicones of the solvent-free Dehesive® 6 series (branched) or Dehesive® 9 series (unbranched) from Wacker Chemie AG. In the case of the binary or ternary mixtures the fraction of the non-functional polydialkylsiloxanes is up to 15% by weight, preferably up to 5% by weight; the fraction of the monofunctional polydialkylsiloxanes is up to 50% by weight; and the fraction of the difunctional polydialkylsiloxanes is at least 50% by weight, preferably at least 60% by weight, based in each case on the total weight of the silicone macromer.

The most preferred silicone macromers b) are α,ω-divinyl-polydimethylsiloxanes.

Preferred water-soluble comonomers c) are ethylenically unsaturated monocarboxylic and dicarboxylic acids or their salts, preferably crotonic acid, acrylic acid, methacrylic acid, fumaric acid, maleic acid; ethylenically unsaturated carboxamides and carbonitriles, preferably acrylamide and acrylonitrile; monoesters and diesters of fumaric acid and maleic acid such as the diethyl and diisopropyl esters and also maleic anhydride; ethylenically unsaturated sulfonic acids and/or their salts, preferably vinylsulfonic acid, 2-methyl-2-propene-1-sulfonic acid, 2-propene-1-sulfonic acid, 2-acrylamido-2-methylpropanesulfonic acid; ethylenically unsaturated cationic monomers, preferably diallyldimethylammonium chloride (DADMAC), 3-trimethylammoniopropyl(meth)-acrylamide chloride (MAPTAC), 2-trimethylammonioethyl (meth)acrylate chloride; ethylenically unsaturated phosphonic acids and/or their salts, preferably vinylphosphonic acid; ethylenically unsaturated hydroxyl esters, preferably 2-hydroxyethyl methacrylate, hydroxypropyl methacrylate, 2-hydroxyethyl acrylate, hydroxypropyl acrylate, glycerol 1-allyl ether; ethylenically unsaturated amino-functional monomers, preferably 2-dimethylaminoethyl methacrylate, 3-dimethylaminopropylmethacrylamide, 3-trimethylammoniopropyl methacrylamide chloride, 2-tert-butylaminoethyl methacrylate, allyl N-(2-aminoethyl)carbamate hydrochloride, allyl N-(6-aminohexyl) carbamate hydrochloride, allyl N-(3-aminopropyl) hydrochloride, allylamine, vinylpyridine.

Particularly preferred water-soluble comonomers c) are crotonic acid, acrylic acid, methacrylic acid, diallyldimethylammonium chloride (DADMAC), 2-methyl-2-propene-1-sulfonic acid, 2-propene-1-sulfonic acid or 2-acrylamido-2-methylpropanesulfonic acid.

In general, 1% to 30% by weight of water-soluble comonomers c) are used, preferably 2% to 10% by weight, and more preferably 2-5% by weight, based on the total weight of components a) to c) used.

The dispersibility of the organosilicone copolymers in water is brought about by interaction of the polar, functional groups of the comonomer units c) and depends on the fraction of the comonomer units c) as a proportion of the total weight of the organosilicone copolymers. The dispersibility of organosilicone copolymers comprising acidic or basic comonomer units c), which in neutral water are not present sufficiently in ionic form, can be enhanced by addition of acids, bases and/or buffers. In the case of organosilicone copolymers with carboxyl-containing comonomer units c), preference is given to pH values of ≥7.5.

Preference is given to organosilicone copolymers which comprise one or more organic monomer units a) selected from the group encompassing vinyl acetate, vinyl laurate, VeoVa9$^R$, VeoVa10$^R$, and VeoVa11$^R$, and one or more silicone macromer units b) selected from the group encompassing α,ω-divinyl-polydimethylsiloxane, α,ω-di(3-acryloyloxypropyl)-polydimethylsiloxane, and α,ω-di(3-methacryloyloxypropyl)-polydimethylsiloxane, and one or more comonomer units c) selected from the group encompassing crotonic acid, vinylsulfonic acid, and diallyldimethylammonium chloride (DADMAC), and, if desired, additional auxiliary monomer units and, if desired, ethylene, the weight fractions of the individual monomers adding up to 100% by weight.

Suitable auxiliary monomers are polymerizable silanes and mercaptosilanes in hydrolyzed form. Preference is given to gamma-acryloyl- and gamma-methacryloyloxypropyl-tri(alkoxy)silanes, α-methacryloyloxymethyltri(alkoxy)silanes, gamma-methacryloyloxypropylmethyldi(alkoxy)silanes, vinylalkyldi(alkoxy)silanes, and vinyltri(alkoxy)silanes, alkoxy groups which can be used being, for example, methoxy, ethoxy, methoxyethylene, ethoxyethylene, methoxypropylene glycol ether or ethoxypropylene glycol ether radicals. Examples thereof are vinyltrimethoxysilane, vinyltriethoxysilane, vinyltripropoxysilane, vinyltriisopropoxysilane, vinyl-tris(1-methoxy)isopropoxysilane, vinyltributoxysilane, vinyltriacetoxysilane, 3-methacryloyloxypropyltrimethoxysilane, 3-methacryloyloxypropylmethyldimethoxysilane, methacryloyloxymethyltrimethoxysilane, 3-methacryloyloxypropyltris(2-methoxyethoxy)silane, vinyltrichlorosilane, vinylmethyldichlorosilane, vinyltris(2-methoxyethoxy)silane, trisacetoxyvinylsilane, 3-(triethoxysilyl)propylsuccinic anhydridesilane. Preference is also given to 3-mercaptopropyltriethoxysilane, 3-mercaptopropyltrimethoxysilane, and 3-mercaptopropylmethyldimethoxysilane.

Further suitable auxiliary monomers are functionalized (meth)acrylates and functionalized allyl ethers and vinyl ethers, especially hydroxyalkyl-functional ones such as hydroxyethyl (meth)acrylate, or substituted or unsubstituted aminoalkyl (meth)acrylates, or cyclic monomers, such as N-vinylpyrrolidone, or N-vinylformamide.

The auxiliary monomers are used generally at a fraction of up to 10% by weight, based on the total weight of the organic monomers a).

The invention further provides a process for preparing highly transparent organosilicone copolymers, which with exclusion of emulsifiers or protective colloids are self-dispersible in water, obtainable by means of free-radically initiated solution polymerization of a) one or more ethylenically unsaturated organic monomers and b) one or more silicone macromers, characterized in that c) one or more water-soluble comonomers are copolymerized in an organic solvent or solvent mixture.

The polymerization is customarily carried out in a temperature interval from 20° C. to 130° C., more particularly between 60° C. and 90° C.

The polymerization can be carried out with all or individual constituents of the reaction mixture included in the initial charge, or with some of them included in the initial charge and the remainder of the constituents, or of individual constituents, of the reaction mixture being metered in subsequently, or by the metering method without an initial charge. The preferred procedure is to include all of the silicone macromer b), portions of the comonomer c), and solvent(s) in the initial charge and to meter in the remainder of the monomers, together or separately. It is further preferred to include some of the initiator, preferably at 3% to 50% by weight, in the initial charge and to meter in the remainder. With particular preference all of the solvents, silicone macromer b), and a portion of the organic monomers a) and comonomers c) are included in the initial charge and the remaining monomers are metered in.

In the form of a batch process, all of the monomers, solvent(s), and a portion of the initiator are included in the initial charge and the remaining initiator is metered in or added in portions.

When solvent mixtures are used, composed for example of isopropanol and water, it is preferred to include all of the comonomers in the initial charge with a portion of the initiator, and to meter in the remaining portion of the water-soluble comonomers and of the initiator.

The molecular weight of the organosilicone copolymers and the distribution of the water-soluble comonomer units c) in the organosilicone compolymers can be influenced in a known way by process parameters such as metering of individual components, metering rate or initiator quantity.

Through the process of the invention it is also possible to obtain polymer solutions of high solids content of organosilicone copolymers, with a solids content of 25% to 90%, preferably with a solids content of 30% to 75%, and more preferably with a solids content of 30% to 70%.

When the polymerization has been concluded, residual monomer can be removed by postpolymerization using known methods. Volatile residual monomers and other volatile constituents can also be removed by means of distillation or stripping methods, preferably under reduced pressure.

Initiators used are oil-soluble initiators such as tert-butyl peroxy-2-ethylhexanoate (TBPEH), tert-butylperoxypivalate (PPV), tert-butyl peroxyneodecanoate (TBPND), dibenzoyl peroxide, tert-amyl peroxypivalate (TAPPI), di(2-ethylhexyl) peroxydicarbonate (EHPC), 1,1-bis(tert-butylperoxy-3,3,5-trimethylcyclohexane, and di(4-tert-butylcyclohexyl) peroxydicarbonate. Other suitable oil-soluble initiators are azo initiators such as azobisisobutyronitrile (AIBN).

Copolymerization with gaseous monomers such as ethylene and vinyl chloride is operated under pressure, generally at between 1 and 100 $bar_{abs}$.

For controlling the molecular weight it is possible where appropriate to use the customary regulators, examples being alcohols such as isopropanol, aldehydes such as acetaldehyde, chlorine compounds, mercaptans such as n-dodecyl mercaptan, tert-dodecyl mercaptan, mercaptopropionic acid (esters).

The isolation of the organosilicone copolymers by separation from solvent and, where appropriate, from other constituents of the reaction mixture is accomplished preferably by means of distillation, with particular preference under vacuum and/or at elevated temperature. The organosilicone copolymers are obtained in the form of a solid. Alternatively the solvent can be removed by steam distillation (stripping), thus producing the organosilicone copolymers directly in the form of an aqueous dispersion.

The invention further provides aqueous dispersions of highly transparent organosilicone copolymers, which with exclusion of emulsifiers or protective colloids are self-dispersible in water, obtainable by means of free-radically initiated solution polymerization of a) one or more ethylenically unsaturated organic monomers and b) one or more silicone macromers, characterized in that c) one or more water-soluble comonomers are copolymerized in an organic solvent or solvent mixture, the copolymer is freed from the solvent, and the solid which remains is dispersed in water.

Aqueous dispersions of the organosilicone copolymers are prepared by incorporating organosilicone copolymers in solid form to water, with stirring. Intense stirring and mixing is continued until a stable dispersion is formed. For this purpose it is preferred to use hot water, more preferably with a water temperature of 20-95° C., most preferably with a water temperature of 50-80° C. In the course of the dispersing operation, the mixture is maintained at a temperature between 10-95° C. The stirrer used is preferably an anchor stirrer.

The aqueous dispersions of the organosilicone copolymers can be admixed with acids, bases or buffers for setting pH values.

The aqueous dispersions have an organosilicone copolymer content of 10% to 40% and preferably of 20% to 35%.

The organosilicone copolymers, which are redispersible in water, are suitable for application in adhesives, coating materials, including as a protective coating for, for example, metals, films, wood or release coating, or for paper treatment, as for example in the tissue sector, as binders for consolidating fibers or other particulate materials. They can also be employed in the textile sector for textile treatment, textile coating, textile finishing, or as a textile finish, and also in the fabric care sector. Additionally they are suitable as modifiers and as hydrophobicizing agents. They can be employed to advantage, furthermore, in the polish sector. In addition, the dispersions can be used as release agents. They are also suitable as binders in the construction sector for paints, adhesives, and coating materials, as for example in tile adhesives and adhesives for integrated thermal protection systems, and especially for use in low-emission polymer-bound emulsion paints and polymer-bound dispersion-based renders, both for the interior sector and for the exterior sector. Alternatively they can be used as an additive, as for example in varnishes, or in cosmetic formulations, such as hair sprays, creams or shampoos. They may be used as release agents and coating materials for producing adhesive coatings.

The examples which follow serve for further illustration of the invention, without restricting it in any way whatsoever.

Raw Materials:

Polydimethylsiloxanes (PDMS) having approximately 100, 133, and 177 repeating $SiOMe_2$ units, α,ω-divinyl-functionalized (VIPO 200, 300, 500). Producer: Wacker Chemie AG Example 1

Organosilicone Copolymer with Carboxyl Groups (2% by Weight of Crotonic Acid)

A 2 l glass stirring pot with anchor stirrer, reflux condenser, and metering devices was charged with 407.0 g of isopropanol, 274.0 g of PDMS mixture, 529.0 g of vinyl acetate, 91.0 g of vinyl laurate, 18 g of crotonic acid, and 1.6 g of PPV (tert-butyl perpivalate, 75% strength solution in aliphatics). The initial charge was then heated to 75° C. at a stirrer speed of 200 rpm. When the internal temperature of 75° C. was reached, the initiator feed (70 g of isopropanol and 4.1 g of PPV) was commenced (metering time: 2 hours). After the end of the initiator feeds, postpolymerization was carried out at 75° C. for 2 hours more. This gave a clear polymer solution having a solids content of 65% by weight and a silicone fraction in the polymer of 30% by weight. Isopropanol was distilled off under vacuum and at elevated temperature.

Redispersing: 20 g of isolated copolymer were introduced into a glass beaker with 80 g of hot water (temperature 50-80° C.) and ammonia, and this charge was stirred with an anchor stirrer. In the course of homogenization, the pH was monitored. The pH must be more than 8 in this case. After about 3 h a stable dispersion was obtained.

Comparative Example 1

0.8% by Weight Crotonic Acid

The procedure carried out was similar to that of example 1, but the concentration of crotonic acid was reduced from 2% by weight, based on the total monomer content, to 0.8% by weight. With this copolymer, no dispersion was obtained.

Example 2

Organosilicone Copolymer with Quaternized Nitrogen Group (4% by Weight of DADMAC)

A 2 l glass stirring pot with anchor stirrer, reflux condenser, and metering devices was charged with 407.0 g of isopropanol, 228.0 g of PDMS mixture, 152.0 g of vinyl acetate, and 1.6 g of PPV (tert-butyl perpivalate, 75% strength solution in aliphatics). The initial charge was then heated to 75° C. at a stirrer speed of 200 rpm. When the internal temperature of 75° C. was reached, the following solutions were metered:

Feed 1: 385 g of vinyl acetate+110 g of vinyl laurate
Feed 2: 57 g of DADMAC (dimethyldiallylammonium chloride) (64% strength in water)
Feed 3: 13 g of PPV+50 g of isopropanol The metering time for feed 1 and 2 was 2 hours and for feed 3 was 3 hours. After feed 3, postpolymerization took place for a further hour at 75° C. This gave a clear polymer solution having a solids content of 65% by weight and a silicone fraction in the polymer of 25% by weight. Isopropanol and water was distilled off under vacuum and at elevated temperature.

Redispersion: 20 g of isolated copolymer were introduced into a glass beaker with 80 g of hot water (50-80° C.) and stirred with an anchor stirrer. After about 3 h a stable dispersion was obtained.

Example 3

Organosilicone Copolymer with Quaternized Nitrogen Group (4% by Weight of DADMAC)

A 2 l glass stirring pot with anchor stirrer, reflux condenser, and metering devices was charged with 377.0 g of isopropanol, 30 g of water, 228.0 g of PDMS mixture, 537.0 g of vinyl acetate, 110 g of vinyl laurate, and 1.6 g of PPV (tert-butyl perpivalate, 75% strength solution in aliphatics). The initial charge was then heated to 75° C. at a stirrer speed of 200 rpm. When the internal temperature of 75° C. was reached, the following solutions were metered:

Feed 1: 57 g of DADMAC (dimethyldiallylammonium chloride) (64% strength in water)
Feed 2: 13 g of PPV+50 g of isopropanol The metering time for feed 1 was 2 hours and for feed 2 was 3 hours. After feed 2, postpolymerization took place for a further hour at 75° C. This gave an almost clear polymer solution having a solids content of 65% by weight and a silicone fraction in the polymer of 24% by weight. Isopropanol and water was distilled off under vacuum and at elevated temperature.

Redispersion: 20 g of isolated copolymer were introduced into a glass beaker with 80 g of hot water (50-80° C.) and stirred with an anchor stirrer. After about 3 h a stable dispersion was obtained.

Comparative Example 2

0.8% by Weight of DADMAC

The procedure carried out was similar to that of example 2, but the concentration of DADMAC was reduced from 4% by weight (based on the total monomer content) to 0.8% by weight. With this copolymer, no dispersion was obtained.

Example 4

Organosilicone Copolymer with Sulfone Group (4% by Weight of 2-methyl-2-propene-1-sulfonic Acid A 2 l glass stirring pot with anchor stirrer, reflux condenser, and metering devices was charged with 373.0 g of isopropanol, 229.0 g of PDMS mixture, 153.0 g of vinyl acetate, and 1.6 g of PPV (tert-butyl perpivalate, 75% strength solution in aliphatics). The initial charge was then heated to 75° C. at a stirrer speed of 200 rpm. When the internal temperature of 75° C. was reached, the following solutions were metered:

Feed 1: 386 g of vinyl acetate+110 g of vinyl laurate
Feed 2: 91 g of 2-methyl-2-propene-1-sulfonic acid (40% strength in water)
Feed 3: 13 g of PPV+50 g of isopropanol The metering time for feed 1 and 2 was 2 hours and for feed 3 was 3 hours. After feed 3, postpolymerization took place for a further hour at 75° C. This gave a clear polymer solution having a solids content of 65% by weight and a silicone fraction in the polymer of 25% by weight. Isopropanol and water was distilled off under vacuum and at elevated temperature.

Redispersion: 20 g of isolated copolymer were introduced into a glass beaker with 80 g of hot water (50-80° C.) and stirred with an anchor stirrer. After about 3 h at room temperature a stable dispersion was obtained.

Comparative Example 3

Organosilicone Copolymer with 0.8% by Weight of 2-methyl-2-propene-1-sulfonic Acid The procedure carried out was similar to that of example 4, but the concentration of 2-methyl-2-propene-1-sulfonic acid was reduced from 4% to 0.8% by weight (based on total monomer content). With this copolymer, no dispersion was obtained.

The invention claimed is:

1. A stable aqueous dispersion of transparent organosilicone copolymers, wherein the transparent organosilicone copolymers are self-dispersible in water and are obtained by means of free-radically initiated solution copolymerization of monomers consisting of
   a) one or more ethylenically unsaturated organic monomers selected from the group consisting of vinyl esters of unbranched or branched alkylcarboxylic acids having 1 to 15 C atoms, vinylaromatics, olefins, dienes, vinyl halides, methyl acrylate, methyl methacrylate, ethyl acrylate, ethyl methacrylate, propyl acrylate, propyl methacrylate, n-butyl, isobutyl, and tert-butyl acrylate, n-butyl, isobutyl, and tert-butyl methacrylate, 2-ethylhexyl acrylate, and norbornyl acrylate,
   b) one or more silicone macromers, and
   c) one or more water-soluble comonomers selected from the group consisting of ethylenically unsaturated monocarboxylic and dicarboxylic acids or their salts, acrylamide, ethylenically unsaturated carbonitriles, monoesters and diesters of fumaric acid and maleic acid, ethylenically unsaturated sulfonic acids and/or their salts, diallyldimethylammonium chloride (DADMAC), 3-trimethylammoniopropylmethacrylamide chloride (MAPTAC), 2-trimethylammonioethyl (meth)acrylate chloride, ethylenically unsaturated phosphonic acids and/or their salts, 2-hydroxyethyl methacrylate, hydroxypropyl methacrylate, 2-hydroxyethyl acrylate, hydroxypropyl acrylate, glycerol 1-allyl ether; 2-dimethylaminoethyl methacrylate, 3-dimethylaminopropylmethacrylamide, 2-tert-butylaminoethyl methacrylate, allyl N-(2-aminoethyl)carbamate hydrochloride, allyl N-(6-aminohexyl)carbamate hydrochloride, allyl N-(3-aminopropyl) hydrochloride, allylamine and vinylpyridine, wherein the one or more water-soluble comonomers c) are applied in an amount of 1% to 30% by weight, based on the total weight of components a) to c), and optionally auxiliary monomers selected from the group consisting of polymerizable silanes, mercaptosilanes in hydrolyzed form, functionalized allyl ethers, vinyl ethers, N-vinylpyrrolidone and N-vinylformamide, wherein the copolymerization is performed in a medium comprising one or more organic solvents.

2. The stable aqueous dispersion of claim 1, wherein the medium comprises alcohols having 1 to 6 C atoms.

3. The stable aqueous dispersion of claim 2, wherein the medium further comprises water.

4. The stable aqueous dispersion of claim 1, wherein the silicone macromer b) has a solubility of less than 5% by weight in the medium under standard (23/50) conditions according to DIN 50014.

5. The stable aqueous dispersion of claim 1, wherein the amount of silicone macromer b) present, based on the total weight of components a-c), is ≥20% by weight.

6. The stable aqueous dispersion of claim 1, wherein ethylenically unsaturated organic monomers a) used are vinyl acetate, or vinyl acetate and ethylene, or vinyl acetate and vinyl esters of α-branched monocarboxylic acids having 5 to 11 C atoms, or vinyl acetate and vinyl laurate and optionally ethylene, or ethylene and vinyl esters of α-branched monocarboxylic acids having 5 to 11 C atoms.

7. The stable aqueous dispersion of claim 1, wherein silicone macromers b) used are linear, branched, cyclic, or three-dimensionally crosslinked silicones having at least 10 repeating siloxane units and having at least one free-radically polymerizable functional group.

8. The stable aqueous dispersion of claim 1, wherein silicone macromers b) used are silicones of the general formula $R^1_a R_{3-a} SiO(SiR_2 O)_n SiR_{3-a} R^1_a$, wherein each R is alike or different and is a monovalent, optionally substituted, alkyl radical or alkoxy radical having in each case 1 to 18 C atoms, $R^1$ is a polymerizable group, a is 0 or 1, and n is 10 to 1000, and wherein the silicones have at least one free-radically polymerizable functional group.

9. The stable aqueous dispersion of claim 1, wherein silicone macromers b) used are one or more from the group consisting of α,ω-divinyl-polydimethylsiloxanes, α,ω-di(3-acryloyloxypropyl)-polydimethylsiloxanes, α,ω-di(3-methacryloyloxypropyl)-polydimethylsiloxanes, α-monovinyl-polydimethylsiloxanes, α-mono(3-acryloyloxypropyl)-polydimethylsiloxanes, α-mono(acryloyloxymethyl)-polydimethylsiloxanes, and α-mono(3-methacryloyloxypropyl)-polydimethylsiloxanes.

10. The stable aqueous dispersion of claim 1, wherein water-soluble comonomers c) used are one or more from the group consisting of crotonic acid, acrylic acid, methacrylic acid, diallyldimethylammonium chloride (DADMAC), 2-methyl-2-propene-1-sulfonic acid, 2-propene-1-sulfonic acid and 2-acrylamido-2-methylpropanesulfonic acid.

11. A release agent or coating material for producing adhesive coatings, comprising the stable aqueous dispersion from claim 1.

12. A coating material for coating textile, paper, films, wood, and metals, comprising the stable aqueous dispersion from claim 1.

13. A weathering-resistant coating or sealant for architectural preservation, comprising the stable aqueous dispersion from claim 1.

14. A polish comprising the stable aqueous dispersion of claim 1.

15. A varnish or cosmetic comprising the stable aqueous dispersion from claim 1.

16. A hair spray or hairsetting agent comprising the stable aqueous dispersion from claim 1.

17. The stable aqueous dispersion of claim 1, wherein the silicone fraction in the copolymer is 15% to 60% by weight, based on the total weight of components a) to c).

18. The stable aqueous dispersion of claim 1, wherein the silicone fraction in the copolymer is 25% to 60% by weight, based on the total weight of components a) to c).

19. The stable aqueous dispersion of claim 1, wherein the water-soluble comonomers c) are applied in amounts of 2% to 10% by weight, based on the total weight of components a) to c).

20. The stable aqueous dispersion of claim 1, wherein silicone macromers b) are silicones having the general formula $R^1_a R_{3-a} SiO(SiR_2 O)_n SiR_{3-a} R^1_a$, where each R is alike or different and is a monovalent, optionally substituted, alkyl radical or alkoxy radical having in each case 1 to 18 C atoms, $R^1$ is a vinyl, allyl, butenyl, a is 0 or 1, and n is 10 to 1000, and wherein the silicones have at least one free-radically polymerizable functional group.

21. A method of making the stable aqueous dispersion of highly transparent organosilicone copolymers according to claim 1, comprising free-radically initiated solution polymerization of monomers consisting of a) one or more ethylenically unsaturated organic monomers selected from the group consisting of vinyl esters of unbranched or branched alkylcarboxylic acids having 1 to 15 C atoms, vinylaromatics, olefins, dienes, vinyl halides, methyl acrylate, methyl methacrylate, ethyl acrylate, ethyl methacrylate, propyl acrylate, propyl methacrylate, n-butyl, isobutyl, and tert-butyl acrylate, n-butyl, isobutyl, and tert-butyl methacrylate, 2-ethylhexyl acrylate, and norbornyl acrylate, b) one or more silicone macromers, and c) one or more water-soluble comonomers selected from the group consisting of ethylenically unsaturated monocarboxylic and dicarboxylic acids or their salts, acrylamide, ethylenically unsaturated carbonitriles, monoesters and diesters of fumaric acid and maleic acid, ethylenically unsaturated sulfonic acids and/or their salts, diallyldimethylammonium chloride (DADMAC), 3-trimethylammoniopropylmethacrylamide chloride (MAPTAC), 2-trimethylammonioethyl (meth)acrylate chloride, ethylenically unsaturated phosphonic acids and/or their salts, 2-hydroxyethyl methacrylate, hydroxypropyl methacrylate, 2-hydroxyethyl acrylate, hydroxypropyl acrylate, glycerol 1-allyl ether; 2-dimethylaminoethyl methacrylate, 3-dimethylaminopropylmethacrylamide, 2-tert-butylaminoethyl methacrylate, allyl N-(2-aminoethyl)carbamate hydrochloride, allyl N-(6-aminohexyl)carbamate hydrochloride, allyl N-(3-aminopropyl) hydrochloride, allylamine and vinylpyridine, wherein the one or more water-soluble comonomers c) are applied in an amount of 1% to 30% by weight, based on the total weight of components a) to c), and optionally auxiliary monomers selected from the group consisting of polymerizable silanes, mercaptosilanes in hydrolyzed form, functionalized allyl ethers, vinyl ethers, N-vinylpyrrolidone and N-vinylformamide, wherein the copolymerization is performed in a medium comprising one or more organic solvents, the copolymer is freed from the one or more organic solvents, and the solid which remains is dispersed in water.

22. A process for preparing highly transparent organosilicone copolymers that are self-dispersible in water, comprising free-radically initiated solution copolymerization of monomers consisting of a) one or more ethylenically unsaturated organic monomers selected from the group consisting of vinyl esters of unbranched or branched alkylcarboxylic acids having 1 to 15 C atoms, vinylaromatics, olefins, dienes, vinyl halides, methyl acrylate, methyl methacrylate, ethyl acrylate, ethyl methacrylate, propyl acrylate, propyl methacrylate, n-butyl, isobutyl, and tert-butyl acrylate, n-butyl, isobutyl, and tert-butyl methacrylate, 2-ethylhexyl acrylate, and norbornyl acrylate, b) one or more silicone macromers, and c) one or more water-soluble comonomers selected from the group consisting of ethylenically unsaturated monocarboxylic and dicarboxylic acids or their salts, acrylamide, ethylenically unsaturated carbonitriles, monoesters and diesters of fumaric acid and maleic acid, ethylenically unsaturated sulfonic acids and/or their salts, diallyldimethylammonium chloride (DADMAC), 3-trimethylammoniopropylmethacrylamide chloride (MAPTAC), 2-trimethylammonioethyl (meth)acrylate chloride, ethylenically unsaturated phosphonic acids and/or their salts, 2-hydroxyethyl methacrylate, hydroxypropyl methacrylate, 2-hydroxyethyl acrylate, hydroxypropyl acrylate, glycerol 1-allyl ether; 2-dimethylaminoethyl methacrylate, 3-dimethylaminopropylmethacrylamide, 2-tert-butylaminoethyl methacrylate, allyl N-(2-aminoethyl)carbamate hydrochloride, allyl N-(6-aminohexyl)carbamate hydrochloride, allyl N-(3-aminopropyl) hydrochloride, allylamine and vinylpyridine, wherein the one or more water-soluble comonomers c) are applied in an amount of 1% to 30% by weight, based on the total weight of components a) to c), and optionally auxiliary monomers selected from the group consisting of polymerizable silanes, mercaptosilanes in hydrolyzed form, functionalized allyl ethers, vinyl ethers, N-vinylpyrrolidone and N-vinylformamide, wherein the copolymerization is performed in a solvent consisting of isopropanol and optionally water.

* * * * *

UNITED STATES PATENT AND TRADEMARK OFFICE
CERTIFICATE OF CORRECTION

PATENT NO. : 8,637,613 B2
APPLICATION NO. : 12/375154
DATED : January 28, 2014
INVENTOR(S) : Abdulmajid Hashemzadeh It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1290 days.

Signed and Sealed this
Twenty-second Day of September, 2015

Michelle K. Lee
*Director of the United States Patent and Trademark Office*